INVENTOR.
Jacques Muller
BY Dean, Fairbank & Hirsch
ATTORNEYS

Sept. 5, 1967  J. MULLER  3,339,736
AUTOMATIC OIL SEPARATOR
Filed Oct. 15, 1964  4 Sheets-Sheet 3

INVENTOR.
Jacques Muller
BY Dean, Fairbank & Hirsch
ATTORNEYS

Sept. 5, 1967  J. MULLER  3,339,736
AUTOMATIC OIL SEPARATOR
Filed Oct. 15, 1964  4 Sheets-Sheet 4

INVENTOR
Jacques Muller
By Dean, Fairbank & Hirsch
ATTORNEYS.

3,339,736
AUTOMATIC OIL SEPARATOR
Jacques Muller, La Garenne-Colombes, France, assignor to Rellumit Inter, S.a.r.L., La Garenne-Colombes, France, a corporation of France
Filed Oct. 15, 1964, Ser. No. 403,990
Claims priority, application France, Oct. 24, 1963, 951,580
10 Claims. (Cl. 210—104)

ABSTRACT OF THE DISCLOSURE

This invention relates to the act of automatic self-cleaning liquid separators for liquids of differing densities and incorporating filters to effect the separating action. At least one of the separated liquids is collected in a tank and upon clogging of the filters, resulting in a pressure drop in the system, the collected liquid is automatically directed back through the filters to clean them.

As conducive to an understanding of the invention it is noted that where a fluid separator is used to separate immiscible fluids such as petroleum products, such as oil from water, and the filters used to effect such separation are of the type, for example, shown in co-pending application Ser. No. 287,346, filed June 12, 1963, now Patent No. 3,214,368, in which the filter device consists of a stack of grooved discs or washers through which the fluids are forced and which effects the separation of the oil and water due to the capillary resistance offered by the grooves and the surface tension of the liquids; where the sediment or particles also contained in the fluids, especially where it is being removed from a body of water such as a harbor, clogs the grooves or passageways of the stack of washers, so that no further fluid can pass therethrough, if the equipment must thereupon be disassembled and the filters removed for cleaning, such procedure is extremely time consuming and reduces the efficiency of the equipment.

It is accordingly among the objects of the invention to provide an equipment for separating oil and water for example, with self-contained cleaning means whereby when the filters incorporated in the equipment become clogged, they may rapidly and automatically be cleaned without disassembly of the device so that the separator may go back into its normal operation in a relatively short period of time thereby increasing the efficiency of the equipment and avoiding the need for skilled mechanics to disassemble and clean the same.

According to the invention, these objects are accomplished by the arrangement and combination of elements hereinafter described and more particularly recited in the claims.

Figure 1:
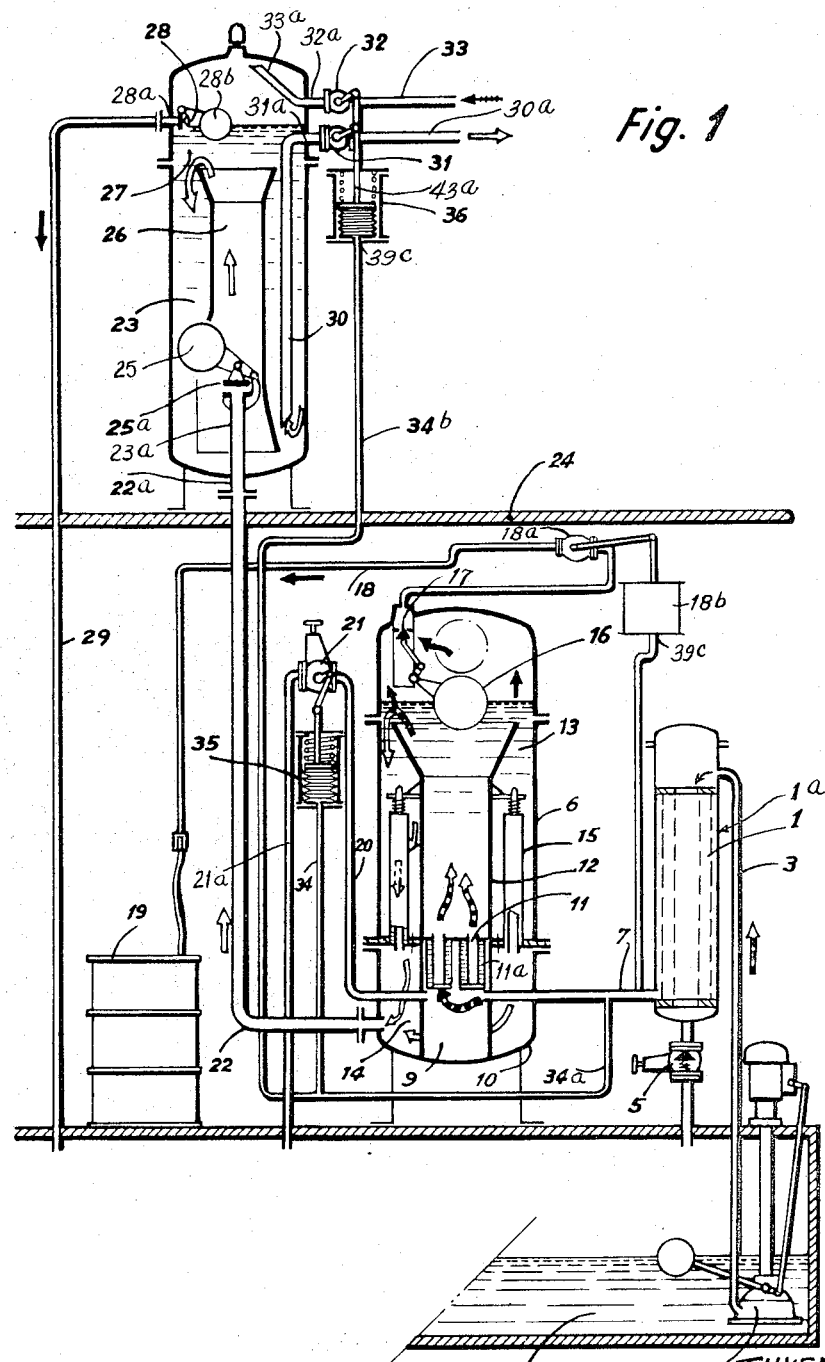
Figure 2:
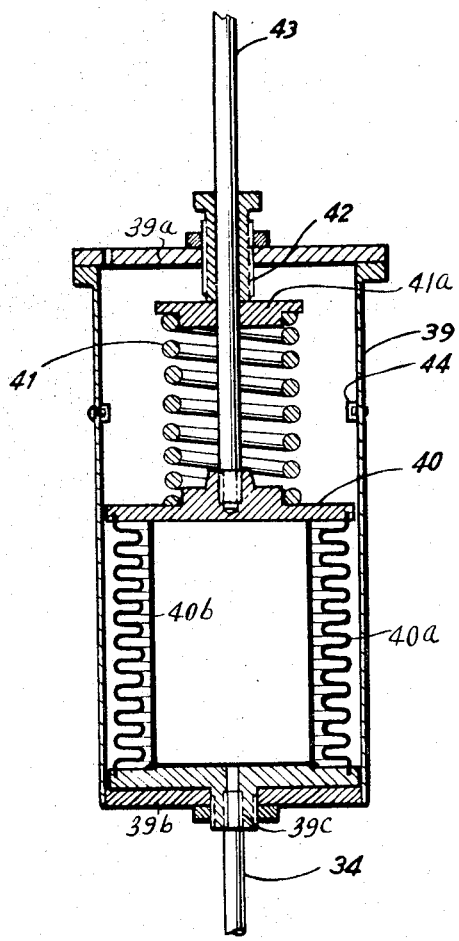
Figure 3:
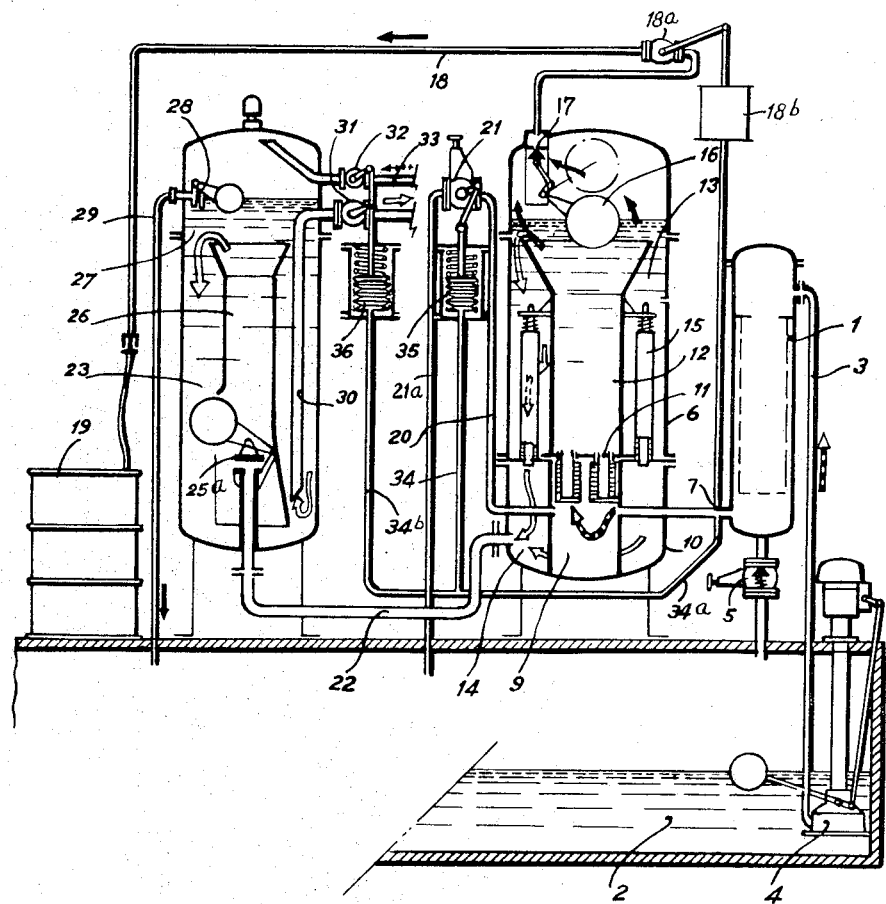
Figure 4:
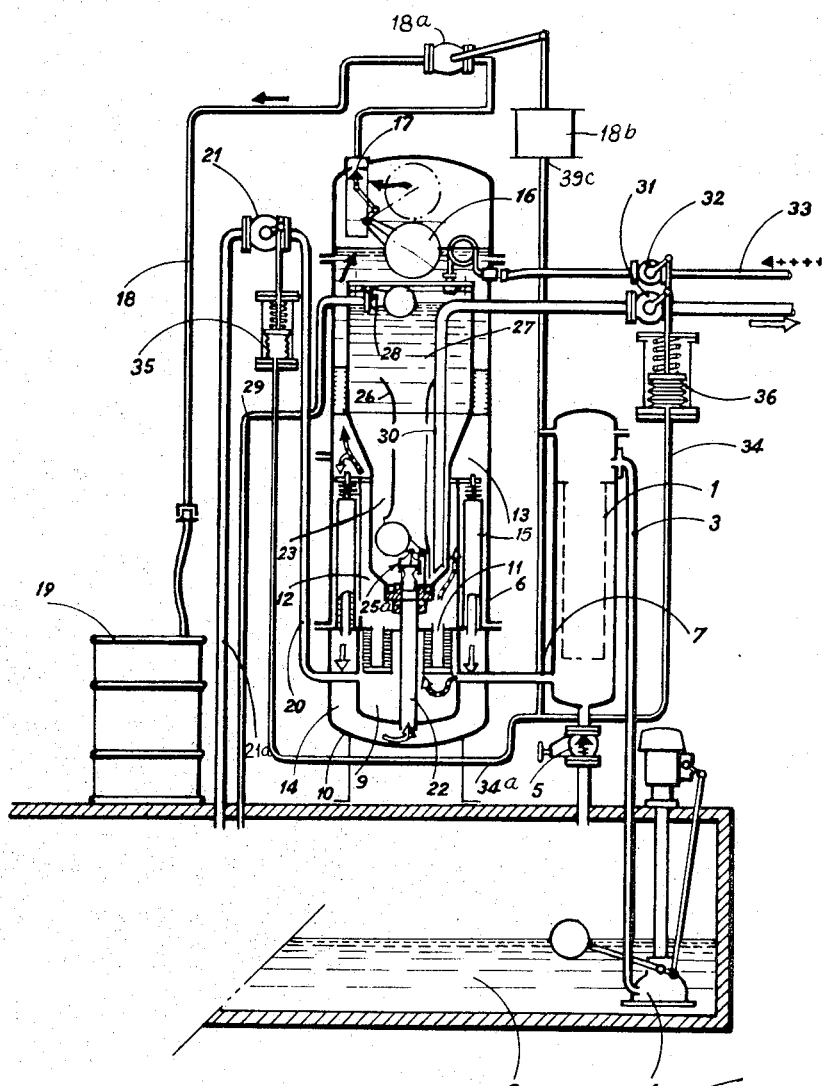

In the accompanying drawings in which are shown one or more of various possible embodiments of the several features of the invention, FIG. 1 is a diagrammatic view of an automatic oil separator, the cleaning of which is effected by means of an elevated flush tank, FIG. 2 is a sectional view of a pressure controlled actuator, FIG. 3 is a view similar to FIG. 1 showing the flush tank on substantially the same level as the remainder of the equipment, and FIG. 4 is a view similar to FIG. 1 with the flush tank incorporated in a filter assembly.

Referring now to the drawings, the automatic oil separator shown in FIG. 1 comprises a pre-filter assembly 1a which may be of the type shown in said co-pending application Ser. No. 287,346, in which the fluids to be separated are forced into a container 1 to pass through stacks of grooved washers for filtration of particles and separation of the immiscible fluids such as oil and water.

The filter assembly desirably comprises columns of discs or washers clamped securely together and having small groves on one or both faces thereof of predetermined dimensions increasing from the inlet to the outlet end of the washer.

The fluids to be separated which are contained in a reservoir or tank 2, for example, are forced into the prefilter 1 at the upper portion thereof by means of a conduit or pipe 3 having its inlet end connected to a pump 4 which is submerged in the liquid in tank 2.

The bottom or discharge end of the prefilter has a pressure valve 5 connected to tank 2 and an outlet pipe 7 connected to the main filter tank 6.

As is shown in FIG. 1, the main filter tank 6 is substantially cylindrical and has an axial cylindrical sleeve 12 rising from the floor 10 thereof with the mouth of the sleeve which is spaced from the upper end of the tank 6 being funnel-shaped with the periphery of the funnel being spaced from the side wall of tank 6.

The pipe 7 has its discharge end leading into the lower portion 9 of the sleeve 12 and positioned in the sleeve 12 immediately above the discharge end of pipe 7 is a filter assembly 11 of the type shown in said co-pending application Ser. No. 287,346, the fluid passing through the sides of the filter column 11a into the bores thereof for further separation of the oil and water and discharge into the portion of sleeve 12 above filter 11.

The separated fluids will be forced to the upper portion of tank 6 and into annular chamber 13 encompassing the sleeve 12. The chamber 13 is also provided with a plurality of filter columns 15 of the type shown in said co-pending application and the separated fluids will pass inwardly through the sides of the columns 15 to be discharged through the bores of such columns into annular chamber 14.

In the upper portion of tank 6 there is positioned a float 16 which through suitable linkage controls a valve member 17 which controls the inlet end of outlet pipe 18 which is connected to the liquid recovery tank 19 through valve 18a.

The lower portion 9 of sleeve 12 is also connected by line 20 to the inlet of a valve 21, the outlet of which is connected by line 21a to tank 2. The valve 21 is controlled by an actuator 35 shown in detail in FIG. 2. The actuator 35 comprises a cylindrical casing 39 having closed ends 39a, 39b.

Secured to the end 39b is one end of a bellows 40a, the other end of the bellows being secured to a piston 40 which carries a depending sleeve 40b that abuts against end 39b to limit the downward movement of piston 40, an abutment 44 in the casing 39 limiting upward movement of the piston 40.

Connected at one end to the piston 40 is a rod 43 which extends axially through the bore of an adjustment screw 42 extending through a threaded opening in the end 39a of the casing 39.

Encompassing the rod 43 and compressed between the piston 40 and a spring follower 41a through which rod 43 extends is a compression spring 41 that normally urges the piston 40 downwardly, the screw 42 reacting against follower 41a to permit adjustment of the tension of spring 41.

The upper end of rod 43 is connected through suitable linkage to the valve 21 to open such valve when the piston 40 is moved downwardly and to close the valve when the piston is moved upwardly.

To energize the actuator 35, the end 39b thereof has a port 39c leading into bellows 40a and which is connected by pipe 34 to common line 34a which is connected to line 7 adjacent the filter unit 1.

The annular chamber 14 is connected by pipe 22 to the inlet port 22a at the lower end of flush tank 23, the latter having a pipe 23a rising axially from such port, said tank 23 being located at a higher plane than the tank 6.

The end of pipe 23a in tank 23 is controlled by a valve 25a actuated through suitable linkage by a float 25.

The pipe 23a extends through a sleeve 26 positioned axially in tank 23, the upper end of sleeve 26 being funnel-shaped and leading into a chamber 27 at the upper portion of said tank 26.

The chamber 27 has an outlet port 28a controlled by a valve 28 actuated through suitable linkage by a float 28b and the port 28a is connected by discharge pipe 29 to tank 2.

The chamber 27 has two additional ports 31a and 32a, the latter being at a higher plane than port 31a, and having a pipe 33a connected thereto in the tank and defining an air inlet nozzle. The port 32a has a pressure inlet pipe 33 connected thereto on the exterior thereof through a control valve 32.

Connected to the port 31a is a discharge pipe 30 which extends from the lower end of tank 23 to said port. The port has a discharge pipe 30a connected thereto on the exterior thereof through a control valve 31.

The valves 31, 32 are ganged together by suitable linkage and connected to the control rod 43a of an actuator 36 identical to actuator 35, the port 39c of actuator 36 being connected by line 34b to common line 34a.

The valve 18a is controlled by actuator 18b identical to actuators 35, 36, the port 39c of actuator 18b being connected to line 7.

In the operation of the equipment shown in FIG. 1, the liquid to be separated, illustratively a mixture of oil and water, contained in tank 2, is pumped under pressure through line 3 into the upper portion of prefilter 1. The liquid will flow downwardly and pass through the filter columns and a coarse separation of the fluids (oil and water) of different density will occur.

The liquid will then flow under pressure through pipe 7 into the chamber 9 of filter tank 6, and such liquid will then flow through the filter columns 11a of filter 11 where a more extensive separation and de-emulsion of the fluids of different density will occur.

The liquid will then be forced upwardly through sleeve 12 where further separation of the fluids of different density will occur. The lighter fluid (oil) will rise to the surface and to the top of tank 6 to be discharged through open valves 17 and 18a and pipe 18 into recovery tank 19. The heavier fluid (water) will flow toward the bottom of chamber 13 and substantially complete further separation will be effected by the filter columns 15 so that substantially only water will pass through such filter with the residual oil rising to the top of the tank 6 for discharge therefrom.

The water flowing under pressure through filter 15 will flow into chamber 14 and through pipes 22 and 23a, into the flush tank 23 and then will be discharged through pipe 30 and valve 31 which is normally open.

Under normal operating conditions, in addition to the valve 31 being open, the valves 17, 18a, 25a and 28a are also open and the valves 5, 21 and 32 are closed.

As soon as the prefilter 1 becomes clogged or as soon as the tank 2 is empty and the pump stops, a drop in pressure will occur in the system.

As a result, the pressure in lines 7 and 34a will drop and since the pistons 40 of actuators 18b, 35 and 36 have been moved upwardly by such pressure against the action of the associated spring 40a, drop in pressure will cause the pistons and the associated rods to be moved downwardly.

As a result, valves 18a and 31 will close and valves 21 and 32 will open.

Due to such valve action, the water contained in the flush tank 23 will flow both by gravity and under the force of the compressed air forced into the upper portion of tank 23 through open valve 32, through the open valve 25a and line 22 into chamber 14. From such chamber the water will flow in reverse direction through filters 15, 11 and 1 to clean such filters and then be discharged through valve 5 into tank 2. In addition, water will also be discharged from sleeve 12 through open valve 21 into tank 2.

The valve 5 is normally set to remain closed until the pressure in filter 1 exceeds a predetermined amount which amount is less than that provided by pump 4 and hence the valve 5 will only open when water is forced from the tank 23 under the combined action of gravity and the compressed air pressure.

Since the water forced into tank 6 from the flush tank 23 will rise to the top thereof, to prevent discharge through line 18 into the tank 19, the normally open valve 18a is provided which is controlled by the actuator 18b. Thus, when the pressure drops in the system, valve 18a will close to prevent flow of water into the oil collector tank 19.

When the water in the flush tank 23 is exhausted, the float 25 will close valve 25a to prevent compressed air from entering the system. However, prior to this time the filters will have been cleaned so that the pump 4 can again force fluid into the system. As a result, the pressure in line 7 will build up so that the actuators 35, 36 and 18b can again close the valves 21, 32 and open the valves 31 and 18a controlled thereby so that normal operation will be resumed, the valves closing due to the reduction in pressure in the system effected by closing of air valve 32.

The embodiment shown in FIG. 3 is identical to that shown in FIG. 1 except that the flush tank 23 is on the same level as the rest of the system. As a result, the back flow of water from the flush tank is substantially solely under the action of the compressed air forced through valve 32.

The embodiment shown in FIG. 4 is also substantially identical to that shown in FIGS. 1 and 3 except that the flush tank 23 is incorporated into the tank 6.

As many changes could be made in the above equipments, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for separating immiscible fluids of two different densities comprising a plurality of filter tanks including a first and a second filter tank, a conduit connecting said tanks, means to force such fluids under pressure into said first of said tanks, filter means in said first tank to effect a first separation of such fluids, filter means in said second tank to effect an additional separation of such fluids, an outlet from said second tank for the fluid of lesser density, an outlet from said second tank for the fluid of heavy density, a flush tank having an inlet connected to the outlet of said second tank for the fluid of heavier density, and means responsive to a drop in pressure below a predetermined amount in the conduit between said filter tanks to force the fluid of heavy density from said flush tank through said filter tanks to clean the filter means therein.

2. The equipment as set forth in claim 1 in which said flush tank has a pair of ports at its upper portion, one of said ports defining a gas port to which a source of gas under pressure may be applied, and the other a fluid discharge port, valve means controlling said ports, a pressure actuator controlled by the pressure in said conduit between said filter tanks to open said valve controlling said gas port and to close the valve controlling said discharge port when the pressure in said conduit falls below a predetermined amount, whereby gas under pressure will force the fluid from said flush tank in reverse direction to clean the filter means in said filter tanks.

3. The equipment as set forth in claim 2 in which said first filter tank has a port, a valve controlling said port, means retaining said valve in closed position with flow of the fluids under pressure to be separated into said first tank and to permit opening of said valve when said gas valve of said flush tank is open.

4. The equipment as set forth in claim 2 in which said first filter tank has a discharge port at its lower end, a valve controlling said port, and means setting said valve to effect opening thereof after the valve controlling the gas port of the flush tank has opened and the pressure in the first filter tank exceeds that of the fluid initially forced into said first filter tank.

5. The equipment as set forth in claim 1 in which said second filter tank has a central sleeve therein extending axially thereof from the bottom of such tank, a fluid separator element is positioned near the lower end of said sleeve, said conduit from said first filter tank extending into said sleeve below said fluid separator therein, the inlet for said flush tank is connected to the outlet for liquid of heavier density of said second tank located near the lower portion thereof, and the inlet of said flush tank has a valve for control of said inlet, and means to close said valve when the level of fluid in said flush tank falls below a predetermined amount.

6. The equipment as set forth in claim 5 in which a second fluid separator is positioned in said second filter tank encompassing said sleeve, said second separator having an outlet in communication with the outlet for liquid of heavier density of said second tank.

7. The equipment as set forth in claim 5 in which a discharge conduit is connected to the sleeve in said second tank near the lower end thereof, a valve controls said conduit, and pressure actuated means normally retaining said valve in closed position when the pressure in the conduit between said two filter tanks exceeds a predetermined amount.

8. The equipment as set forth in claim 1 in which a valve controls the outlet in said second tank for fluid of lesser density, and means controlling said valve to close the latter when the level of the fluid in said second tank falls below a predetermined amount.

9. The equipment as set forth in claim 1 in which the flush tank is in substantially the same horizontal plane as the filter tanks.

10. The equipment as set forth in claim 1 in which the flush tank is in a horizontal plane above that of said flush tanks.

References Cited
UNITED STATES PATENTS

| | | | |
|---|---|---|---|
| 2,772,786 | 12/1956 | Gardes | 210—333 |
| 3,138,552 | 6/1964 | Richards | 210—108 X |
| 3,228,524 | 1/1966 | Richards | 210—108 X |

REUBEN FRIEDMAN, *Primary Examiner.*

D. RIESS, *Assistant Examiner.*